(12) United States Patent
Onodera et al.

(10) Patent No.: US 6,480,457 B1
(45) Date of Patent: Nov. 12, 2002

(54) CARTRIDGE RECEIVING APPARATUS AND CARTRIDGE DISC PLAYER UTILIZING SAME

(75) Inventors: Katsuhiro Onodera, Tokorozawa (JP); Hideo Ito, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 137 days.

(21) Appl. No.: 09/629,945

(22) Filed: Aug. 1, 2000

(30) Foreign Application Priority Data

Aug. 6, 1999 (JP) .......................................... 11-224298

(51) Int. Cl.⁷ .......................... G11B 17/04; G11B 17/22
(52) U.S. Cl. .................................................. 369/178.01
(58) Field of Search .......................... 369/178, 178.01, 369/258, 36, 38; G11B 17/22

(56) References Cited

U.S. PATENT DOCUMENTS

| | | | |
|---|---|---|---|
| 5,726,828 A | * | 3/1998 | Kakuta et al. ............. 360/98.01 |
| 5,757,740 A | * | 5/1998 | Osada ........................... 369/36 |
| 5,790,507 A | | 8/1998 | Fujiwara et al. |
| 5,802,038 A | | 9/1998 | Tsuchiya |
| 6,246,643 B1 | * | 6/2001 | Satoh et al. .................. 369/38 |
| 6,396,794 B1 | * | 5/2002 | Tsugami et al. ........ 369/178.01 |

FOREIGN PATENT DOCUMENTS

| | | |
|---|---|---|
| JP | 62293558 | 12/1987 |
| JP | 08147846 | 11/1994 |
| JP | 11149687 | 6/1999 |

* cited by examiner

Primary Examiner—William Korzuch
Assistant Examiner—Christopher R. Beacham
(74) Attorney, Agent, or Firm—Nixon & Vanderhye

(57) ABSTRACT

A cartridge receiving apparatus comprises a receiving unit for receiving at least one cartridge; at least one support unit for supporting the cartridge received; and a detection device for detecting a position of the support unit. A decision as whether receipt of the cartridge is completed or not is made in accordance with detection results obtained by the detection device.

4 Claims, 5 Drawing Sheets

CARTRIDGE RECEIVING APPARATUS AND CARTRIDGE DISC PLAYER UTILIZING SAME

BACKGROUND OF THE INVENTION

1. Field of the Invention

The present invention relates to a cartridge receiving apparatus for receiving cartridges into which record media such as a mini disc, a floppy disc, a VHD disc, a tape, a solid memory or the like are received, and to a cartridge disc player utilizing the cartridge receiving apparatus.

2. Description of the Related Art

There has conventionally been known a cartridge disc player in which a plurality of cartridge discs such as a mini disc are received and a desired one disc is selected from these discs to make record or reproduction. The cartridge disc player comprises a receiving unit for receiving the cartridge discs, a playback unit for making record or reproduction for the cartridge disc and a transfer unit for transferring the cartridge disc between the receiving unit and the playback unit.

The receiving unit is provided with a plurality of receiving spaces into which the cartridge discs are inserted manually by a user. When the receiving unit receives the cartridge discs, the transfer unit transfers the cartridge disc from the receiving unit to the playback unit so as to start the playback.

However, the insertion operation of the cartridge disc is manually carried out by the user, leading to a possible incomplete insertion. In the conventional cartridge disc player, there is not made detection as whether the cartridge is completed or not. Consequently, the transfer unit may operate in an incomplete receiving state and in such a case, the cartridge disc cannot be loaded, thus leading to a locking problem in the mechanical structure. The user may waste time.

There has conventionally been known a cartridge disc player in which a receipt detection switch for detecting the complete insertion of the disc cartridge is provided on each of the receiving spaces, in order to prevent the occurrence of such a problem. A plurality of receipt detection switches corresponding to the number of the cartridge discs are required, leading to complication of the entire structure.

SUMMARY OF THE INVENTION

An object of the present invention is therefore to provide a cartridge receiving apparatus in which there can be made a decision of the completed receipt of the cartridge with the use of a simple structure, and a cartridge disc player utilizing the cartridge receiving apparatus.

In order to attain the aforementioned object, at least one support unit for supporting at least one cartridge and a detection device for detecting a completed insertion of the cartridge are subjected to a combined use. More specifically, the cartridge receiving apparatus of the present invention, comprises: a receiving unit for receiving the cartridge; at least one support unit for supporting said cartridge received; and a detection device for detecting a position of said support unit, a decision as whether receipt of said cartridge is completed or not being made in accordance with detection results obtained by said detection device.

According to the above-mentioned features of the present invention, the support unit for supporting the cartridge and the detection device for detecting the completed insertion of the cartridge are subjected to a combined use. Consequently, it is possible to reduce a number of structural elements in comparison with the conventional manner in which the support unit and the detection device are independently provided. Provision of a display device such as a lamp or the like for displaying whether the receipt of the cartridge has been completed or not, makes it possible to give warning of incomplete insertion to the user or the like, thus avoiding the waste of time due to the incomplete insertion. The cartridge may include record media such as a mini disc, a floppy disc, a VHD disc, a tape, a solid memory or the like. The detection device may include a switch, a sensor or the like.

The above-mentioned support unit may support said cartridge by fitting a part of said support unit into a hole formed on a shutter of said cartridge, and the position of said support unit may be changeable.

According to such features of the present invention, support of the cartridge by the support unit causes variation in position of the support unit so that the complete insertion state can be detected by means of the detection device.

The apparatus may further comprise at least one insertion detection device for detecting insertion of said cartridge into said receiving unit, a decision as whether receipt of said cartridge being completed or not is made in accordance with combination of detection results obtained by said insertion detection device and the detection results obtained by said detection device.

According to such features of the present invention, when the cartridge is inserted so that the insertion distance exceeds a prescribed value, the insertion detection device detects the insertion of the cartridge. When the insertion detection device detects the insertion, the cartridge is kept in any one of the incomplete and complete insertion states. When the detection device detects the complete insertion, there is made a decision that the cartridge has been received completely. When the detection device does not detect the complete insertion, there is a decision made that the cartridge has been received incompletely. If the insertion detection device is not provided, it is impossible to distinguish the complete insertion state from the other state in which the cartridge has been inserted by a small insertion distance and then pulled out. In such a case, it is necessary to check the existence of the cartridge disc in accordance with the user's reproduction instructions for the cartridge disc, leading to a waste operation, even when the cartridge disc does not exist in the receiving space. The insertion detection device may include a switch, a sensor or the like.

There may be adopted a structure that said at least one cartridge comprises a plurality of cartridges and said receiving unit has a plurality of receiving spaces into which said plurality of cartridges can be received respectively; said at least one insertion detection device comprises a plurality of insertion detection devices that are provided for the respective receiving spaces; said at least one support unit comprises a plurality of support units that are provided for the respective receiving spaces; and said detection device is provided for said plurality of support units. The detection device detects the complete insertion of all the cartridges. A decision of existence of the cartridge that is received incompletely in the whole receiving unit as well as a decision of complete receipt of the cartridge in each of the receiving spaces are made on the basis of the detection results obtained by the detection device and the detection results obtained by the insertion detection devices provided for the respective receiving spaces.

According to the present invention, the single detection device is provided for the plurality of support units and there is a decision made of incomplete or complete receipt of the cartridge. It is therefore possible to reduce a number of structural elements in comparison with the conventional manner in which the detection devices are provided for the respective receiving spaces and a decision of incomplete or complete receipt of the cartridge is made for the respective receiving spaces.

The other cartridge receiving apparatus of the present invention comprises: a receiving unit for receiving at least one cartridge; at lease one leaf spring a part of which is fitted into a hole formed on a shutter of said cartridge to support said cartridge; a lever, which is moved by resilient deformation of said leaf spring; and a detection device for detecting a position of said lever, a decision as whether receipt of said cartridge is completed or not being made in accordance with detection results obtained by said detection device.

According to the features of the present invention, the leaf spring for supporting the cartridge serves as a part of the detection device for detecting the compete insertion of the cartridge, thus reducing a number of structural elements.

There may be adopted a structure that said at least one cartridge comprises a plurality of cartridges and said receiving unit has a plurality of receiving spaces into which said plurality of cartridges can be received respectively; said at least one leaf spring comprises a plurality of leaf springs that are provided for the respective receiving spaces; said lever is provided for said plurality of leaf springs so that resilient deformation of at least one of said plurality of leaf springs causes said lever to move.

According to such features of the present invention, the single lever is provided for the plurality of leaf springs, which can resiliently be deformed independently, and the detection device detects the position of the lever so that a decision of the complete or incomplete receipt of the cartridge is made. It is therefore possible to reduce a number of structural elements in comparison with the conventional manner in which the detection devices are provided for the respective receiving spaces and a decision of incomplete or complete receipt of the cartridge is made for the respective receiving spaces.

A cartridge disc player of the present invention, comprises: a receiving unit for receiving at least one cartridge; at least one support unit for supporting said cartridge received; and a detection device for detecting a position of said support unit; and a transfer unit for transfer said cartridge between said receiving unit and a playback unit, a decision as whether receipt of said cartridge is completed or not being made in accordance with detection results obtained by said detection device, and said cartridge having a shutter that is closed by said support unit when said cartridge is transferred from said playback unit to said receiving unit.

According to the features of the present invention, the support unit for supporting the cartridge and the detection device for detecting the complete insertion of the cartridge are subjected to a combined use, thus reducing a number of structural elements.

DETAILED DESCRIPTION OF THE PREFERRED EMBODIMENTS

Now, embodiments of a cartridge receiving apparatus of the present invention will be described in detail below with reference to the accompanying drawings.

Figure 1:
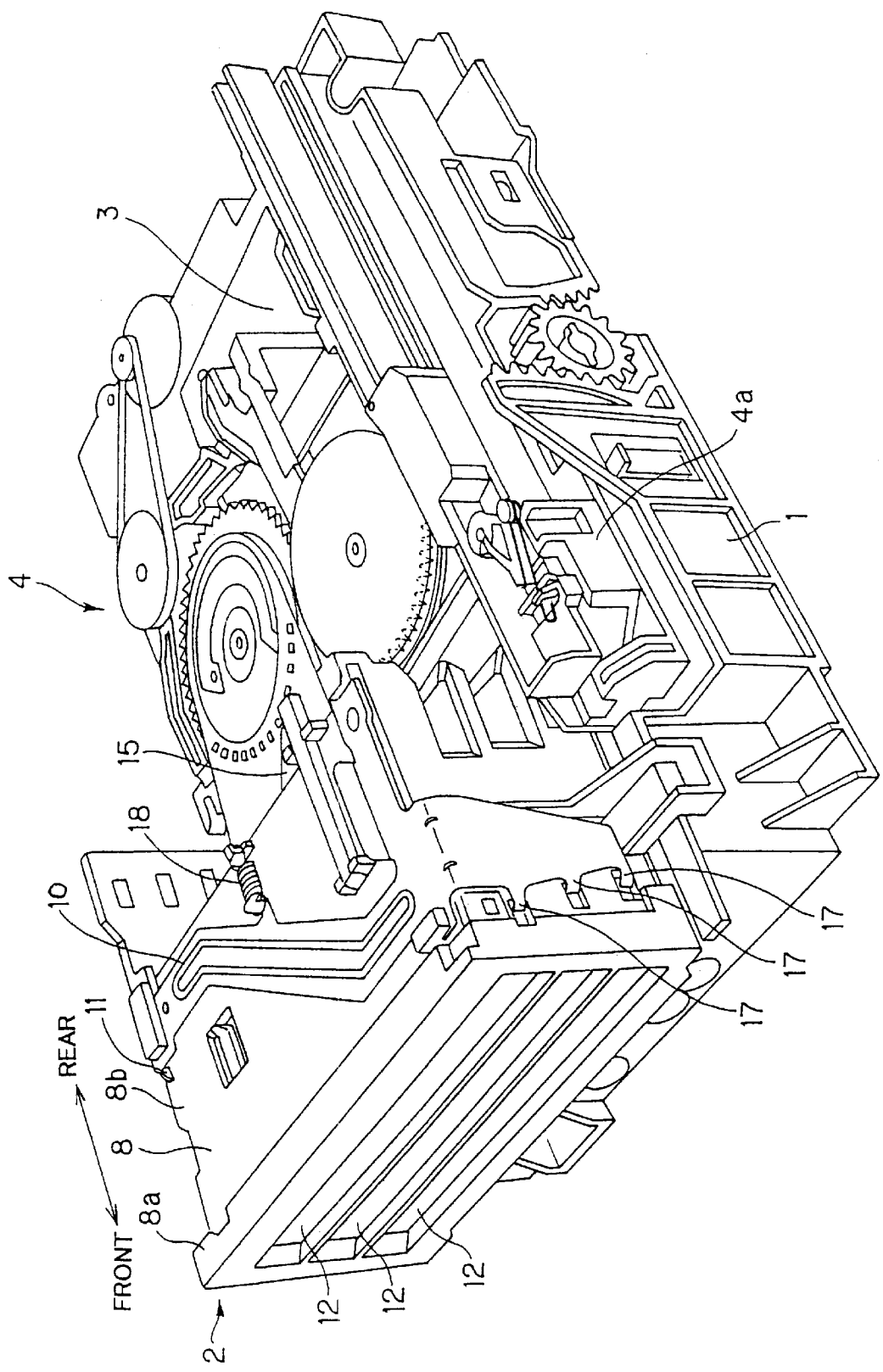
FIG. 1 is a perspective view illustrating a cartridge disc player of the first embodiment of the present invention.
Figure 2:
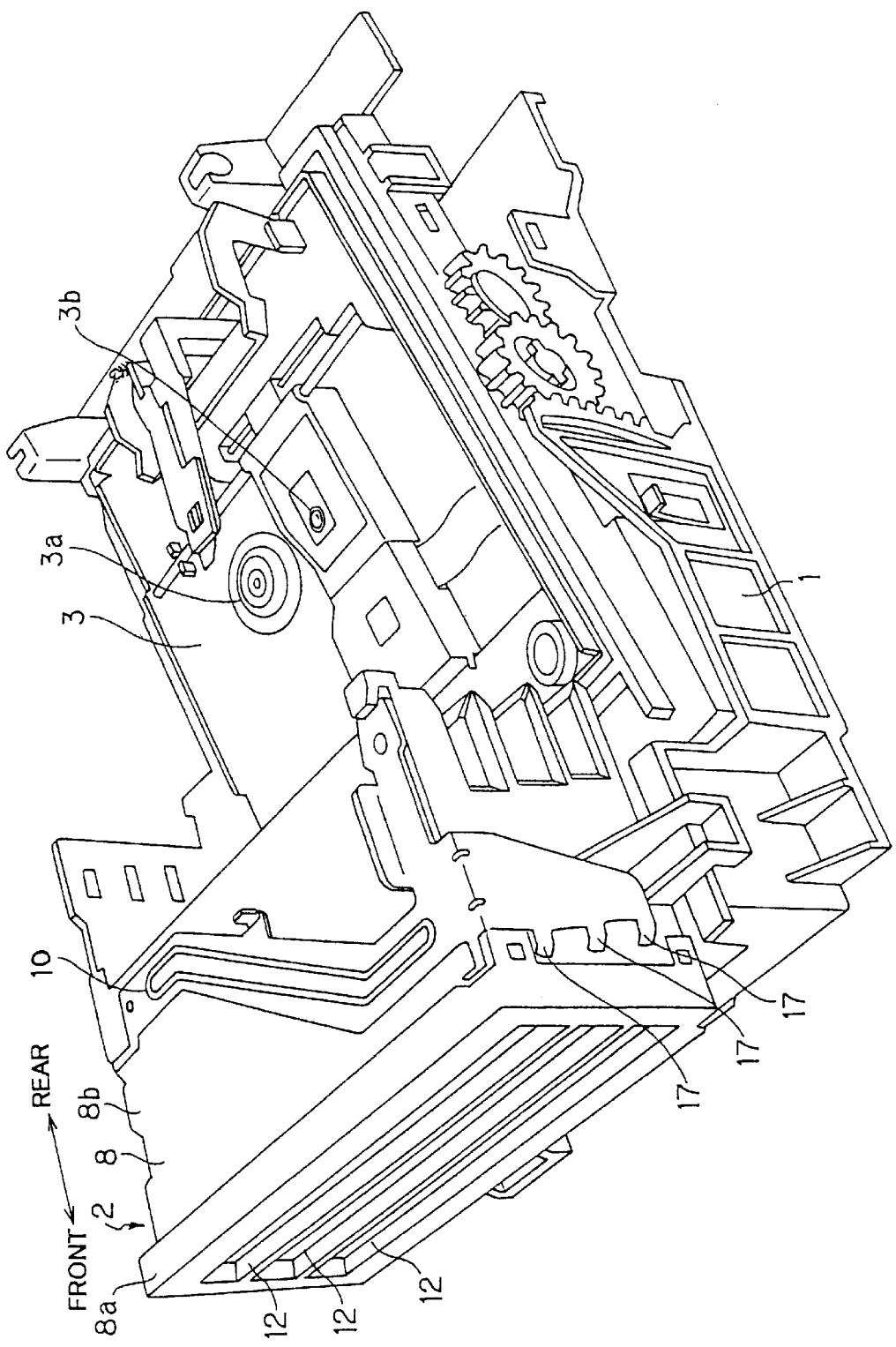
FIG. 2 is a perspective view illustrating the state in which a transfer unit is removed from the disc player as shown in FIG. 1.

FIGS. 1 and 2 are perspective views illustrating an embodiment of the cartridge disc player into which the cartridge receiving apparatus is incorporated. The cartridge disc player is used as a player for mini discs or the like. The cartridge disc player comprises a base unit 1, a cartridge receiving unit 2 for receiving a plurality of cartridges, for example, three cartridges (hereinafter referred to as the "receiving unit"), a playback unit 3 having a pickup 3b and a turntable 3a and a transfer unit 4 for transferring the cartridge disc (hereinafter referred to as the "disc") received in the receiving unit 2 to the playback unit 3. FIG. 1 illustrates the cartridge disc player into which the base unit 1, the receiving unit 2, the playback unit 3 and the transfer unit 4 are assembled. FIG. 2 illustrates the state in which the transfer unit 4 is removed from the assembled units to show the playback unit 3 locating below the transfer unit 4.

The entire operation of the cartridge disc player will be described. The operations after the insertion of disc before the reproduction of information recorded on the disc will be described in time sequence.

① With respect to the ejection operation, the receiving unit 2 is moved forward relative to the base unit 1. The receiving unit 2 comes into contact with a front cover pivoted on an audio equipment to open the front cover, along with the movement of the receiving unit 2. In this state, a plurality of discs are received in the receiving unit 2 by an insertion operation of a user. The structure of the receiving unit 2 will be described later.

② After the disc is inserted in the receiving unit 2, the receiving unit 2 moves rearward relative to the base unit 1. The front cover of the audio equipment closes along with the rearward movement of the receiving unit 2.

③ With respect to the selection operation, the transfer unit 4 moves upward to the position of the disc received in accordance with the user's instructions. The transfer unit 4 moves up, while keeping a parallel state with the base unit 1 so as to reach the position of the disc. FIG. 1 illustrates a state in which the transfer unit 4 is placed in the lowermost position.

④ With respect to the disc-loading operation, the transfer lever 4a of the transfer unit 4 engages with the disc and the disc is withdrawn in the inside. The shutter opens during the withdrawing operation of the disc so that a part of the disc is exposed. The structure of the disc will be described later.

⑤ The transfer unit 4 moves downward and the mini disc is placed on the turntable 3a of the playback unit 3 (see FIG. 2).

⑥ Then, the turntable 3a of the playback unit 3 turns and the pickup 3 moves in the diametrical direction of the disc to carry out the reproduction or record of information recorded on the disc.

Now, description will be given below of an operation of discharging the disc after the completion of reproduction of information.

① The transfer unit 6 moves upward to the original position in which the disc has been received.

② The drive of the transfer lever 4a causes the disc to move forward to return the disc to the receiving unit 2. The shutter of the disc closes in the receiving unit 2.

③ The transfer unit 4 moves downward to return the original position.

④ The receiving unit 2 moves forward relative to the base unit 1 and an ejection operation is carried out again. The above-described front cover opens and the user pulls out the disc in which the playback has been completed.

Figure 3:
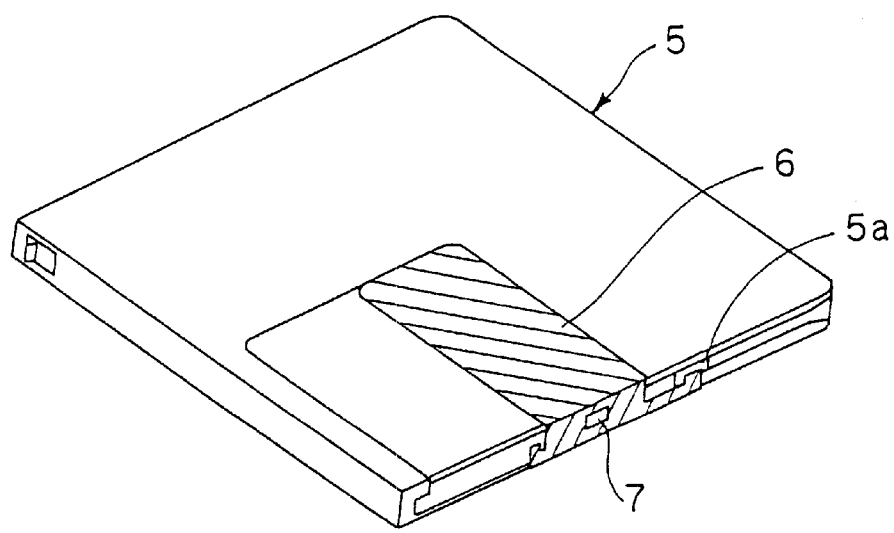
FIG. 3 is a perspective view illustrating a mini disc.

FIG. 3 is a perspective view illustrating the disc that is received in the receiving unit 2. The disc 5 is composed of a disc body and a cartridge in which the disc body is received, in the conventional manner. The disc 5 has the shutter 6, which is openable to expose the disc body. When the playback operation is carried out, the shutter 6 opens to reproduce information recorded on the disc body. The cartridge is provided with a shutter-engaging portion 5a, which engages with the shutter 6. The engagement state ensures the closing condition of the shutter 6. When the shutter 6 is opened, the engagement of the shutter-engaging portion 5a is released. The shutter 6 has on its side surface a shutter-hole 7 having a rectangular shape.

Figure 4:
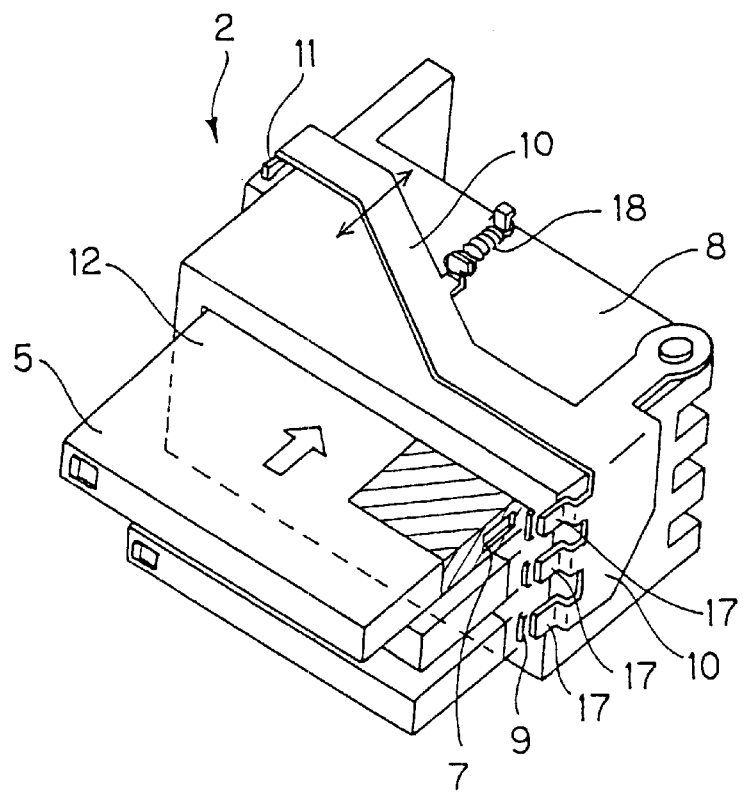
FIG. 4 is a perspective view illustrating a receiving unit of the cartridge.

FIG. 4 is a perspective view illustrating the receiving unit 2. The receiving unit 2 comprises the receiving unit 8 having three receiving spaces in the vertical direction, the leaf spring 9 serving as the support unit for supporting the cartridge received in the receiving unit 8, the switch lever 10, which is swingable by the resilient deformation of the leaf spring 9 and the complete receipt detection switch 11 serving as the detection device for detecting the position of the switch lever 10.

The receiving unit 8 is composed of a receiving unit body 8b and a front inlet 8a that is secured on the front end of the receiving unit body 8b. The front inlet 8a has three slots 12. These slots 12 have tapered portions for easy insertion of the disc. The receiving unit body 8b is provided on the opposite inner side surfaces with guide rails 13 for guiding the disc (see FIGS. 5 and 7). The user inserts the disc 5 from the slot 12 so that the disc 5 is guided along the guide rails 13 to move in the inside of the receiving unit body 8 as shown in FIG. 4.

Figure 5:
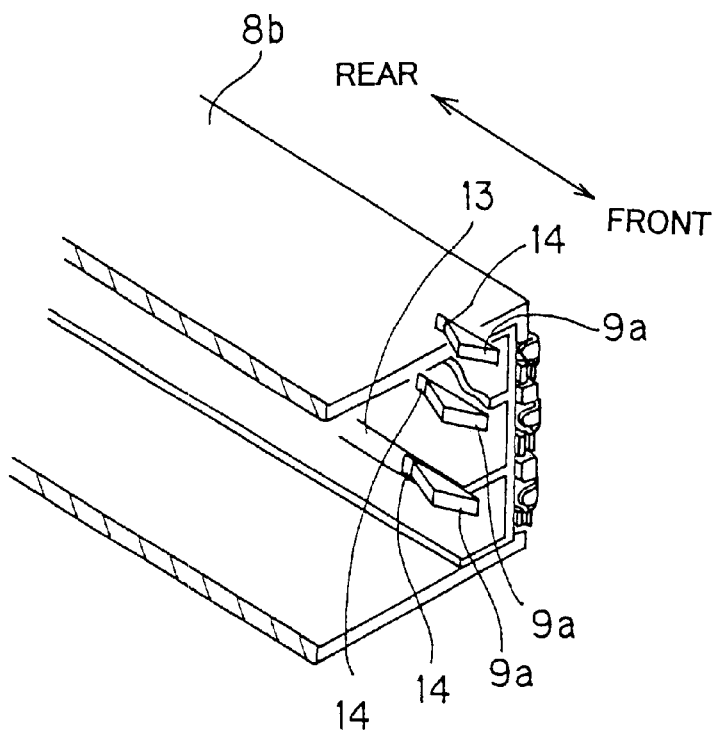
FIG. 5 is a perspective view illustrating a leaf spring serving as a support unit.

The leaf spring 9 engages with the shutter-hole 7 of the disc 5 to support the disc 5. The leaf spring 9 is provided on the outer side surface of the receiving unit body 8b as shown in FIG. 5. The leaf spring 9 has a projection portion 9a having an L-shape, which projects from a leaf spring-opening 14 formed on the side surface of the guide rail 13 into the receiving space. The leaf spring 9 has the rear end, which is fixed to the receiving unit body 8b and the other free end. The leaf spring 9 is composed of three spring portions corresponding to the receiving spaces for the disc 5. The three spring portions can resiliently be deformed independently.

When the user inserts the disc 5, the projection portion 9a of the leaf spring 9 comes into contact with the disc 5 so that the leaf spring 9 is resiliently deformed. Further insertion of the disc 5 causes the projection portion 9a of the leaf spring 9 to be fitted into the shutter-hole so that the leaf spring 9 returns in the original state. In such a state, the receipt of the disc 5 is completed. After the completion of receipt of the disc 5, a positional restriction lever 15 extending so as to bar the rear end of the receiving unit body 8b restricts the further insertion of the disc 5 (see FIG.

Figure 6A:
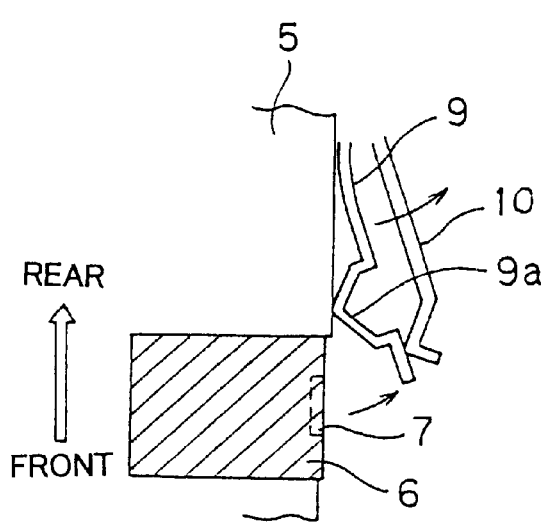
FIG. 6(a) is. a plan view illustrating the state of the leaf spring and the switch lever during insertion of the disc.
Figure 6B:
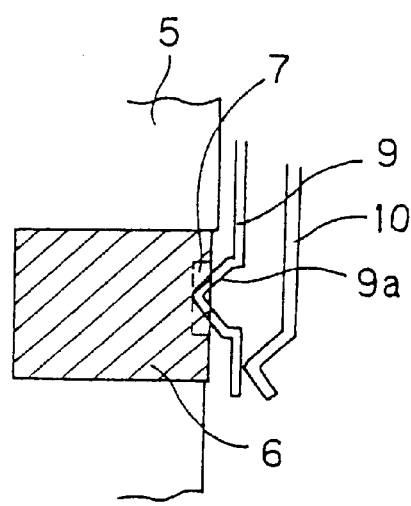
FIG. 6(b) is a plan view illustrating the state of them after the completion of insertion.

As shown in FIG. 4, the switch lever 10 swings by the elastic deformation of the leaf spring 9 to push the complete receipt detection switch 11. The switch lever 10 is mounted on the receiving unit body 8b so as to be swingable. The switch lever 10 has three engaging portions 17, which can come into contact with the leaf spring 9. A coil spring 18 presses the engaging portions 17 on the leaf spring 9. The resilient deformation of the leaf spring 9 causes the switch lever 10 to swing during the insertion operation of the disc 5 as shown in FIG. 6(a), resulting in the maintenance of "ON" state of the complete receipt detection switch 11. When the leaf spring is fitted into the shutter-hole 7 of the cartridge after completion of receipt of the disc 5, the leaf spring 9 returns in the original state. Accordingly, the switch lever 10 swings in its original state, resulting in the maintenance of "OFF" state of the complete receipt detection switch 11. The leaf spring 9 has not only the function of supporting the disc 5, but also the function of swinging the switch lever 10.

The complete receipt detection switch 11 serving as the detection device for detecting the position of the switch lever 10 provides the "ON" state when the leaf spring 9 is deformed, and the "OFF" state when it returns in the original state. More specifically, the complete receipt detection switch 11 provides the "ON" state during the insertion operation of the disc 5 and the "OFF" state when the disc is inserted completely or not inserted. The single switch lever 10 and the single complete receipt detection switch 11 are provided for the three leaf springs 9. Resilient deformation of any one of the leaf springs 9 causes the "ON" state of the complete receipt detection switch 11.

Figure 7:
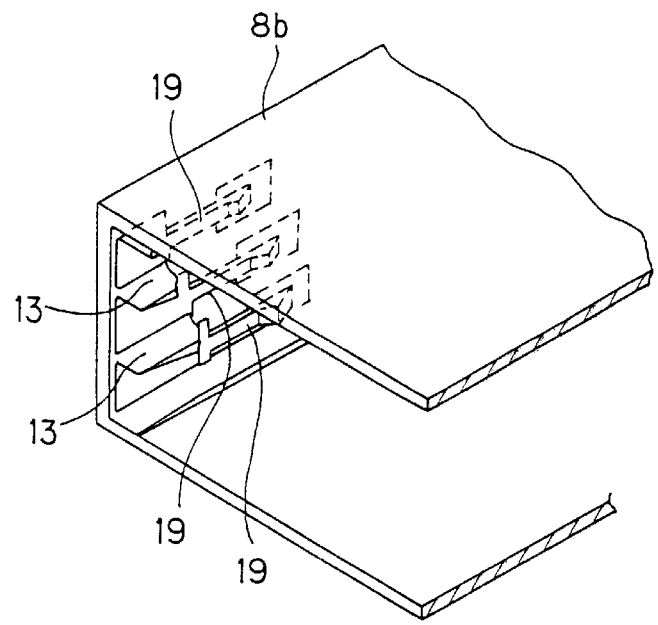
FIG. 7 is a perspective view illustrating an insertion detection switch and the adjacent elements.

FIG. 7 is a perspective view illustrating the other side surface opposite to the side surface onto which the leaf springs 9 are provided. Insertion detection leaf springs 19 are provided on the above-mentioned other side surface integrally with the guide rails 13. Insertion detection switches serving as the insertion detection device are provided on the opposite surfaces of the insertion detection leaf springs 19. Insertion of the disc 5 causes the insertion detection leaf springs 19 to be elastically deformed to provide the "ON" state of the insertion detection switch. In the "ON" state of the insertion detection switch, the disc 5 is inserted completely or incompletely. The three insertion detection switches are provided in accordance with the number of the receiving spaces.

The complete receipt tamps serving as the display device, which are provided for the respective slots 12, light up on the basis of the detection results obtained by the complete receipt detection switch 11 and the insertion detection switch. More specifically, the lamp lights up only when the disc 5 is completely received in the respective slots, thus causing the user to recognize the complete insertion of the disc. Lighting of the lamp causes the user to recognize the incomplete insertion of the disc, thus reducing any useless operation of the cartridge player due to the incomplete insertion of the disc. The lamp does not light up when no disc is inserted. When the insertion is incomplete (i.e., in the incomplete receipt state), a visible warning or a sound alarm is given.

Description will be given below of relationship between the combination of the detection results obtained by the complete receipt detection switch 11 and the detection results obtained by the insertion detection switch, on the one hand, and the lamp display, on the other hand. Insertion of the disc 5 even by a small insertion distance causes the insertion detection switch to turn into "ON" state. In the "ON" state of the insertion detection switch, the disc 5 is accordingly inserted in a complete or incomplete manner. If the complete receipt detection switch 11 is "OFF", there is made a decision that insertion is complete for all the slots in which the insertion detection switches are "ON", and the lamps for the respective slots light up. If the complete receipt detection switch 11 is "ON", there is made a decision that insertion is incomplete for at lease one of the slots in which the insertion detection switches are "ON", and any lamp does not light up. The slot in which the insertion detection switch is "OFF" indicates the slot into which no disc 5 is inserted. If the insertion detection device is not provided and only the complete receipt detection switch 11 exists, it is impossible to distinguish the complete insertion state from the other state in which the cartridge has been inserted by a small insertion distance and then pulled out. In such a case, it is necessary to check the existence of the cartridge disc in accordance with the user's reproduction instructions for the cartridge disc, leading to a waste operation, even when the cartridge disc does not exist in the receiving space.

Figure 8A:
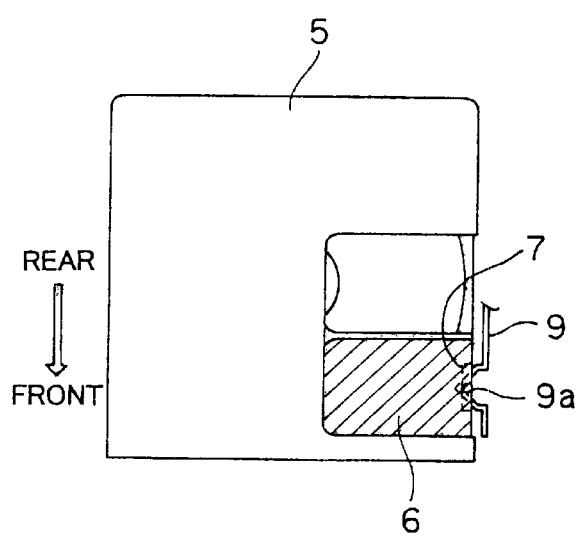
FIG. 8(a) is a plan view illustrating the disc during returning operation of the disc from the playback unit to the receiving unit and FIG. 8(b) is a plan view illustrating the disc after the completion of the returning operation of the disc.
Figure 8B:
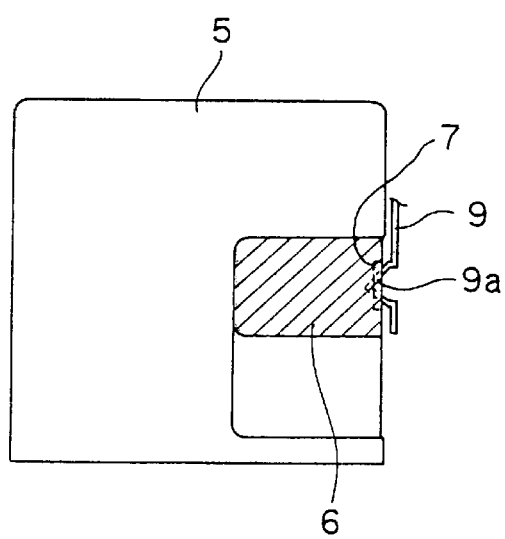

The transfer unit 4 transfers the disc 5 to the playback unit 3 after the completion of receipt of the disc 5, to start the playback operation for the disc 5 as mentioned above. FIG. 8 illustrates the disc 5, which is returned from the playback unit 3 to the receiving unit 2 by means of the transfer unit 4 after the completion of the playback operation. In the playback unit 3, the reading of information recorded on the disc 5 is carried out, keeping the shutter opened. The transfer unit 4 returns the disc 5 with the shutter opened to the receiving unit 2. In this case, the disc 5 moves forward from the rear portion of the transfer unit 2 as shown in FIG. 8(a). The projection portion 9a of the leaf spring 9 is fitted into the shutter-hole 7 during the forward movement of the disc 5. The further forward movement of the disc 5 causes the shutter 6 to close gradually and the shutter 6 is finally closed completely (see FIG. 8(b)). The leaf springs 9 have functions of (i) supporting the disc 5, (ii) detecting the complete insertion of the disc 5 and (iii) closing the shutter of the disc 5, thus making it possible to reduce a number of structural elements.

According to the present invention as described in detail, the cartridge receiving apparatus of the present invention comprises a receiving unit for receiving at least one cartridge; at least one support unit for supporting said cartridge received; and a detection device for detecting a position of said support unit, a decision as whether receipt of said cartridge is completed or not being made in accordance with detection results obtained by said detection device. According to the above-mentioned features of the present invention, the support unit for supporting the cartridge and the detection device for detecting the completed insertion of the cartridge are subjected to a combined use. Consequently, it is possible to reduce a number of structural elements in comparison with the conventional manner in which the support unit and the detection device are independently provided. Provision of a display device such as a lamp or the like for displaying whether the receipt of the cartridge has been completed or not, makes it possible to give warning of incomplete insertion to the user or the like, thus avoiding the waste of time due to the incomplete insertion.

What is claimed is:

1. A cartridge receiving apparatus, comprising:

a receiving unit for receiving at least one cartridge;

at least one leaf spring a part of which is fitted into a hole formed on a shutter of said cartridge to support said cartridge;

a lever, which is moved by resilient deformation of said leaf spring;

a deception device for detecting a position of said lever and enabling a decision as to whether receipt of said cartridge is completed or not to be made in accordance with detection results obtained by said detection device;

wherein said at least one cartridge comprises a plurality of cartridges and said receiving unit has a plurality of receiving spaces into which said plurality of cartridges can be received, respectively;

said at least one leaf spring comprises a plurality of leaf springs that are provided for the respective receiving spaces; and said lever is provided for said plurality of leaf springs so that resilient deformation of at least one of said plurality of leaf springs causes said lever to move.

2. The cartridge receiving apparatus as claimed in claim 1, further comprising:

at least one insertion detection device for detecting insertion of said cartridge into said receiving unit and enabling a decision as to whether receipt of said cartridge being completed or not to be made in accordance with a combination of detection results obtained by said insertion detection device and the detection results obtained by said detection device.

3. A cartridge disc player, comprising:

a receiving unit for receiving a plurality of cartridges;

a plurality of leaf springs, a part of each of which is fitted into a hole formed on a shutter of the cartridge to support the cartridge;

a lever, which is moved by resilient deformation of said leaf spring; and a detection device for detecting a position of the leaf spring and enabling a decision as to whether receipt of said cartridge is completed or not to be made in accordance with detection results obtained by said detection device; and a transfer unit for transferring the cartridge between said receiving unit and a playback unit;

said cartridge having a shutter that is closed by the leaf spring when said cartridge is transferred from said playback unit to said receiving unit.

4. The cartridge disc player as claimed in claim 3, further comprising:

at least one insertion detection device for detecting insertion of said cartridge into said receiving unit and enabling a decision as to whether receipt of said cartridge being completed or not to be made in accordance with a combination of detection results obtained by said insertion detection device and the detection results obtained by said detection device.

* * * * *

UNITED STATES PATENT AND TRADEMARK OFFICE
CERTIFICATE OF CORRECTION

PATENT NO. : 6,480,457 B1
DATED : November 12, 2002
INVENTOR(S) : Onodera et al.

It is certified that error appears in the above-identified patent and that said Letters Patent is hereby corrected as shown below:

Column 8,
Line 12, substitute -- detection' -- for "deception."

Signed and Sealed this

Tenth Day of June, 2003

JAMES E. ROGAN
*Director of the United States Patent and Trademark Office*